(12) United States Patent
Kelly (10) Patent No.: US 10,583,834 B2
(45) Date of Patent: Mar. 10, 2020

(54) VEHICLE SPEED CONTROL SYSTEM AND METHOD

(71) Applicant: JAGUAR LAND ROVER LIMITED, Whitley, Coventry, Warwickshire (GB)

(72) Inventor: James Kelly, Solihull (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 71 days.

(21) Appl. No.: 15/875,545

(22) Filed: Jan. 19, 2018

(65) Prior Publication Data

US 2018/0141550 A1 May 24, 2018

Related U.S. Application Data

(63) Continuation of application No. 14/910,696, filed as application No. PCT/EP2014/065909 on Jul. 24, 2014, now Pat. No. 9,873,430.

(30) Foreign Application Priority Data

Aug. 7, 2013 (GB) .................................. 1314153.6

(51) Int. Cl.
*B60W 30/14* (2006.01)
*B60K 28/16* (2006.01)
(Continued)

(52) U.S. Cl.
CPC ......... *B60W 30/143* (2013.01); *B60K 28/165* (2013.01); *B60T 8/1755* (2013.01);
(Continued)

(58) Field of Classification Search
CPC ... B60K 28/165; B60W 10/16; B60W 10/188; B60W 30/143; B60W 2520/266; B60W 2540/18; B60T 8/1755
(Continued)

(56) References Cited

U.S. PATENT DOCUMENTS 6,038,506 A    3/2000   Diekhans et al.
6,285,944 B1   11/2001   Tange et al.
(Continued)

FOREIGN PATENT DOCUMENTS

DE    19626341 A1   1/1998
DE    10332669 A1   2/2005
(Continued)

OTHER PUBLICATIONS

Combined Search and Examination Report corresponding to application No. GB1314153.6, dated Feb. 18, 2014, 5 pages.
(Continued)

*Primary Examiner* — Atul Trivedi
(74) *Attorney, Agent, or Firm* — Reising Ethington P.C.

(57) ABSTRACT

A vehicle speed control system operable to cause a vehicle to operate in accordance with a target speed value, the system being further operable automatically to control cross-axle locking means of an axle of the vehicle to cause an increase in resistance to relative rotation of wheels of the axle. Thus, the speed control system may be operable automatically to command the cross-axle locking means to increase the resistance to relative rotation of wheels of the axle without a driver being required to intervene to command assumption of this condition.

18 Claims, 6 Drawing Sheets

(51) Int. Cl.
*B60W 10/16* (2012.01)
*B60W 10/188* (2012.01)
*B60T 8/1755* (2006.01)

(52) U.S. Cl.
CPC .......... *B60W 10/16* (2013.01); *B60W 10/188* (2013.01); *B60W 2520/266* (2013.01); *B60W 2540/18* (2013.01)

(58) Field of Classification Search
USPC .......................................................... 701/41
See application file for complete search history.

(56) References Cited

U.S. PATENT DOCUMENTS

| | | | |
|---|---|---|---|
| 6,351,702 B1 | 2/2002 | Tange et al. | |
| 7,349,776 B2 | 3/2008 | Spillane et al. | |
| 8,244,443 B2* | 8/2012 | Oshima | B60K 28/16 |
| | | | 180/197 |
| 9,162,656 B2* | 10/2015 | Mattson | B60T 8/17554 |
| 9,573,595 B2 | 2/2017 | Fairgrieve et al. | |
| 9,630,623 B2 | 4/2017 | Fairgrieve et al. | |
| 9,873,430 B2 | 1/2018 | Kelly et al. | |
| 2001/0056544 A1 | 12/2001 | Walker | |
| 2007/0142987 A1 | 6/2007 | Takamatsu et al. | |
| 2007/0150118 A1 | 6/2007 | Takamatsu et al. | |
| 2009/0088941 A1 | 4/2009 | Tsuchiya et al. | |
| 2010/0245123 A1* | 9/2010 | Prasad | B60T 8/175 |
| | | | 340/870.41 |
| 2011/0082634 A1* | 4/2011 | Povirk | B60K 17/344 |
| | | | 701/88 |
| 2011/0251748 A1 | 10/2011 | Moran et al. | |
| 2012/0080249 A1* | 4/2012 | Yates, III | B60L 7/18 |
| | | | 180/65.31 |
| 2013/0291830 A1* | 11/2013 | Doering | F02D 41/023 |
| | | | 123/350 |
| 2013/0296121 A1* | 11/2013 | Gibson | F02D 41/022 |
| | | | 477/5 |
| 2013/0296123 A1* | 11/2013 | Doering | B60W 10/02 |
| | | | 477/5 |
| 2013/0296132 A1* | 11/2013 | Doering | B60K 6/48 |
| | | | 477/86 |
| 2013/0296136 A1* | 11/2013 | Doering | B60K 6/48 |
| | | | 477/167 |
| 2014/0114547 A1* | 4/2014 | Chimner | B60T 8/172 |
| | | | 701/73 |
| 2015/0191169 A1 | 7/2015 | Fairgrieve et al. | |
| 2015/0203115 A1 | 7/2015 | Fairgrieve et al. | |
| 2015/0203116 A1 | 7/2015 | Fairgrieve et al. | |
| 2015/0210282 A1 | 7/2015 | Fairgrieve et al. | |
| 2015/0217766 A1 | 8/2015 | Kelly et al. | |
| 2015/0217767 A1 | 8/2015 | Kelly et al. | |
| 2015/0232093 A1 | 8/2015 | Fairgrieve et al. | |
| 2016/0194001 A1 | 7/2016 | Kelly | |
| 2017/0021824 A1* | 1/2017 | Johri | B60W 20/19 |

FOREIGN PATENT DOCUMENTS

| | | |
|---|---|---|
| DE | 102005049397 A1 | 4/2006 |
| DE | 102006050215 A1 | 6/2007 |
| DE | 102010028486 A1 | 11/2011 |
| EP | 1355209 A1 | 10/2003 |
| GB | 2494413 A | 9/2011 |

OTHER PUBLICATIONS

International Search Report corresponding to International application No. PCT/EP2014/065909, dated Oct. 10, 2014, 7 pages.
Written Opinion corresponding to International application No. PCT/EP2014/065909, dated Oct. 10, 2014, 7 pages.

* cited by examiner

FIGURE 6

VEHICLE SPEED CONTROL SYSTEM AND METHOD

FIELD OF THE INVENTION

This disclosure relates to a system for controlling the speed of a vehicle. In particular, but not exclusively, the disclosure relates to a system for controlling the speed of a land-based vehicle which is capable of driving in a variety of different and extreme terrains and conditions. Aspects of the invention relate to a system, to a method and to a vehicle.

The content of UK patent application no GB1214651.0 and U.S. Pat. No. 7,349,776 are hereby incorporated by reference.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, and the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes.

SUMMARY OF THE INVENTION

Embodiments of the invention may be understood with reference to the appended claims.

Aspects of the present invention provide a system, a vehicle and a method.

In one aspect of the invention for which protection is sought there is provided a vehicle speed control system operable to cause a vehicle to operate in accordance with a target speed value, the system being further operable automatically to control cross-axle locking means of an axle of the vehicle to cause an increase in resistance to relative rotation of wheels of the axle.

Thus, the speed control system may be operable automatically to command the cross-axle locking means to increase the resistance to relative rotation of wheels of the axle without a driver being required to intervene to command assumption of this condition.

The increase in resistance to relative rotation may be referred to as an increase in cross-axle lock or assumption of a cross-axle lock condition, in some arrangements. The cross-axle locking means may comprise one or more clutch packs as described below.

The system may be operable to control the cross-axle locking means to cause an increase in resistance to relative rotation of wheels of the axle in dependence at least in part on a determination that a wheel of the axle is rotating faster than another wheel of the axle by more than a prescribed amount.

The prescribed amount may be a substantially fixed value. Alternatively the prescribed amount may be a value determined in dependence on one or more parameters. The value may be determined from a look-up table (LUT), by means of an algorithm, or by any other suitable means.

In some embodiments the prescribed amount may be selected in dependence on the identity of a driving mode in which the vehicle is operating, such as the identity of a terrain response mode in which the vehicle is operating, and/or other driving mode.

The system may be operable to control the cross-axle locking means of the vehicle to cause an increase in resistance to relative rotation of wheels of the axle if it is determined that a cross-axle surface mu delta condition exists, being a condition in which a difference in coefficient of friction, mu, between respective wheels of an axle and a corresponding driving surface exceeds a prescribed value.

The system may be operable to control the cross-axle locking means of the vehicle to cause an increase in resistance to relative rotation of wheels of the axle in further dependence at least in part on a steering angle of the vehicle.

The system may be operable to control the cross-axle locking means of the vehicle to cause an increase in resistance to relative rotation of wheels of the axle in further dependence at least in part on wheel articulation. That is, the amount of an increase in resistance to relative rotation of wheels of an axle may in some embodiments be varied in dependence on the relative amounts of travel of a suspension of each wheel. By suspension travel is meant non-rotational travel of a wheel in an upward or downward direction relative to a reference position.

The amount of the increase may be determined in dependence on steering angle in some embodiments. The increase may be greater for smaller steering angles, and smaller for larger steering angles, so as not to induce excessive understeer. In some embodiments the control system may take into account the expected difference in wheel speeds due to cornering in determining whether to command the cross-axle locking means to increase the resistance to relative rotation of the wheels of the axle.

Alternatively, in some embodiments the control system may cause the cross-axle locking means to increase the resistance to relative rotation independently of steering angle. In some embodiments the control system may cause the cross-axle locking condition to be assumed provided the cross-axle surface mu delta condition exists and the further condition is met that one wheel of the difference in wheel speeds exceeds that which would be expected for a cornering condition of the vehicle by more than a threshold amount, regardless of the instant steering angle. The threshold amount may be substantially constant, or determined in dependence on one or more parameters.

The system may be operable to control the cross-axle locking means of the vehicle to cause an increase in resistance to relative rotation of wheels of the axle only if the steering angle is less than a prescribed value.

It is to be understood that steering angle is defined herein as substantially zero for a straight-ahead steering position. The control system may determine steering angle by reference to a position of a steering wheel of the vehicle (or other user-operated steering control), or by reference to steerable roadwheel angle. The steering angle is considered to increase to a value greater than zero if the steering wheel (or steerable road wheels) are turned in a left or right-hand steering direction. Other arrangements are also useful.

The system may be operable to apply a brake to a wheel of an axle to reduce a difference in speed between respective wheels of the axle in dependence at least in part on a result of the determination that the wheel is rotating faster than another wheel of the axle by more than the prescribed amount. Thus if a wheel is rotating faster than another wheel of the axle by more than the prescribed amount, the brake may be applied to the wheel that is rotating the fastest. This is because this wheel is likely to be a wheel experiencing a lower value of surface coefficient of friction with the driving surface and therefore the one that is failing to gain sufficient traction.

The brake may be applied for a prescribed period of time or for a prescribed distance of travel. The prescribed period or prescribed distance may be determined in dependence on one or more parameters such as a speed of travel of the vehicle, a type of terrain over which the vehicle is travelling, a driving mode in which the vehicle is driving or any other suitable parameter.

The prescribed amount may be an amount exceeding that expected for a current steering angle by more than a threshold value.

The prescribed amount may be a substantially fixed amount.

The system may be operable to apply the brake to the wheel of the axle to reduce the difference in speed between respective wheels of the axle, the system being operable subsequently to command the increase in resistance to relative rotation of wheels of the axle by means of the cross-axle locking means.

The system may be operable to command the increase in resistance to relative rotation of wheels of the axle by means of the cross-axle locking means if at least one condition is met selected from amongst the conditions that the brake is applied for more than a prescribed period or distance of travel or the amount of brake pressure exceeds a prescribed amount for a prescribed period or distance of travel and the surface mu delta condition still exists.

Thus, the control system may seek to reduce slip of one wheel over ground by application of a brake, and subsequently to command the cross-axle locking means to increase the resistance to relative rotation of wheels of the axle. The system may be operable to apply a brake to the wheel experiencing the lower surface coefficient of friction to slow rotation of the wheel and increase a probability of the wheel gaining improved traction.

Other arrangements are also useful.

The amount of the increase in resistance to relative rotation of the wheels induced by the cross-axle locking means may be set in dependence on the amount of brake force applied by the brake.

The system may be operable to transition from application of brake force to resist relative rotation to the use of the cross-axle locking means to reduce relative rotation in a coordinated manner. The system may take into account an effect of application of a brake to one wheel on the torque developed at another wheel, in attempting to reduce excessive slip of one or more wheels.

The value of surface mu for each wheel may be determined for example in dependence on an amount of wheel slip experienced by a wheel at a given location. Other arrangements are also useful.

The system may be operable to apply the brake to the wheel of the axle to reduce the difference in speed between respective wheels of the axle, the system being operable subsequently to command the increase in resistance to relative rotation of wheels of the axle by means of the cross-axle locking means in dependence on a rate of progress of the vehicle over ground following application of the brake.

The system may be operable to determine whether to command the increase in resistance to relative rotation of the wheels in dependence on speed of the vehicle over ground or rate of acceleration of the vehicle over ground. The system may determine whether the speed or acceleration is satisfactory once a prescribed period of time has elapsed, or a prescribed number of wheel revolutions have taken place. Other arrangements are also useful.

In other words, in some embodiments the system may be operable to apply a brake to reduce excessive rotation of the wheel on the surface having the lower surface coefficient of friction before causing the axle to assume the cross-axle lock condition. If satisfactory progress over ground is not made whilst the brake is applied, the system may be operable to command the axle to assume the cross-axle lock condition.

The system may be operable to control the amount by which a resistance to relative rotation of wheels of an axle is resisted by means of the cross-axle locking means and an amount of brake force applied by a brake of a wheel in anticipation of optimised values required to negotiate an obstacle. Thus the system may set the values of brake force and resistance to relative rotation of wheels of an axle by the cross-axle locking means in advance of an attempt to negotiate an obstacle. The obstacle may be in the form of a surface of relatively steep gradient and/or relatively low coefficient of friction.

For example, if the vehicle is required to negotiate a step, or a pothole, such that only one wheel of a given axle is required to negotiate the step or pothole and therefore experience greater wheel speed than the other wheel, the cross-axle locking means may be controlled to reduce any resistance to relative rotation imposed thereby to a level sufficient to allow the difference in wheel speed to occur. The controller may therefore be operable to apply one or more brakes of the vehicle to reduce wheel slip whilst the obstacle is negotiated, in preference to use of the cross-axle locking means.

The system may be operable to apply the brake to the wheel experiencing the lower surface coefficient of friction instead of commanding the increase in resistance to relative rotation of wheels of the axle by means of the cross-axle locking means in dependence on steering angle.

In some embodiments, if steering angle exceeds a prescribed value, the system may be operable not to cause the cross-axle lock condition to be assumed, but rather to apply a brake to the wheel experiencing the lower surface coefficient of friction, as described above.

In one aspect of the invention there is provided a system according to a preceding aspect in combination with cross-axle locking means.

The cross-axle locking means may comprise a differential gearbox.

The differential gearbox may be operable to prevent relative rotation of respective left and right output portions thereof, the output portions being operable to drive respective left and right wheels of an axle.

The cross-axle locking means may comprise at least one clutch, the at least one clutch being operable to increase the resistance to relative rotation of wheels of an axle.

It is to be understood that the at least one clutch may comprise a dog clutch, a multi-plate wet clutch or any other suitable clutch. The clutch may be referred to as a cross-axle lock clutch.

In the case of a clutch that is not a dog clutch, the clutch may be operable to allow slip between an input portion and an output portion thereof. The amount of the increase in resistance to relative rotation introduced by the cross-axle locking means may be controlled in some embodiments by controlling an amount of pressure (or force) urging two or more plates of the clutch together. The pressure may be applied by means of hydraulic fluid, an electrical actuator or any other suitable means.

It is to be understood that the cross-axle locking means may increase the resistance to relative rotation of wheels of the axle by substantially preventing relative rotation. Where relative rotation is prevented, the cross-axle locking means may be considered to increase the resistance to relative rotation substantially to infinity.

In a further aspect of the invention for which protection is sought vehicle comprising a system according to any preceding claim.

In a further aspect of the invention for which protection is sought there is provided a method of controlling a vehicle comprising: causing a vehicle to operate in accordance with a target speed value; and automatically controlling cross-axle locking means of an axle of the vehicle to cause an increase in resistance to relative rotation of wheels of the axle.

In one aspect of the invention for which protection is sought there is provided a vehicle speed control system operable to cause a vehicle to operate in accordance with a target speed value, the system being further operable to cause an axle of the vehicle to assume a cross-axle lock condition in which relative rotation of wheels of the axle with respect to one another is substantially prevented, wherein the system is operable to cause the axle to assume the cross-axle lock condition when it is determined that (a) a cross-axle surface mu delta condition exists, being a condition in which a difference in coefficient of friction, mu, between respective wheels of an axle and a corresponding driving surface exceeds a prescribed value, and (b) a wheel experiencing the lower surface coefficient of friction is rotating faster than the wheel experiencing the higher surface coefficient of friction by more than a prescribed amount.

The prescribed amount may be a substantially fixed value. Alternatively the prescribed amount may be a value determined in dependence on one or more parameters. The value may be determined from a look-up table (LUT), by means of an algorithm, or by any other suitable means.

Thus, the speed control system may be operable automatically to command the axle to assume the cross-axle lock condition without a driver being required to intervene to command assumption of this condition.

The system may be operable to cause the axle to assume the cross-axle lock condition in further dependence at least in part on a steering angle of the vehicle.

Thus, the control system may take into account the expected difference in wheel speeds due to cornering in determining whether to command the cross-axle lock condition to be assumed.

Alternatively, in some embodiments the control system may cause the cross-axle lock condition to be assumed independently of steering angle. In some embodiments the control system may cause the cross-axle lock condition to be assumed provided conditions (a) and (b) are met and the difference in wheel speeds exceeds that which would be expected for a cornering condition of the vehicle, regardless of the instant steering angle. For example, the control system may cause the cross-axle lock condition to be assumed if the difference in wheel speeds exceeds that which would be expected for a cornering condition of the vehicle at maximum steering angle, regardless of the instant steering angle.

However, advantageously, the speed control system takes into account steering angle in determining whether to cause the cross-axle lock condition to be assumed.

The system may be operable to cause the axle to assume the cross-axle lock condition only if the steering angle is less than a prescribed value.

It is to be understood that steering angle is defined herein as substantially zero for a straight-ahead steering position. The control system may determine steering angle by reference to a position of a steering wheel of the vehicle (or other user-operated steering control), or by reference to steerable roadwheel angle. The steering angle is considered to increase to a value greater than zero if the steering wheel (or steerable road wheels) are turned in a left or right-hand steering direction. Other arrangements are also useful.

The system may be operable in certain circumstances to apply a brake to the wheel experiencing the lower surface coefficient of friction when conditions (a) and (b) are met instead of or in addition to causing the axle to assume the cross-axle lock condition.

Thus the system may be operable to apply a brake to the wheel experiencing the lower surface coefficient of friction to slow rotation thereof and increase a probability of the wheel gaining improved traction.

The system may be operable to apply the brake to the wheel experiencing the lower surface coefficient of friction when conditions (a) and (b) are met, the system being operable subsequently to cause the axle to assume the cross-axle lock condition in dependence on a rate of progress of the vehicle over ground following application of the brake.

The system may be operable to determine whether to cause the axle to assume the cross-axle lock condition in dependence on speed of the vehicle over ground or rate of acceleration of the vehicle over ground. The system may determine whether the speed or acceleration is satisfactory once a prescribed period of time has elapsed, or a prescribed number of wheel revolutions have taken place. Other arrangements are also useful.

In other words, in some embodiments the system may be operable to apply a brake to reduce excessive rotation of the wheel on the surface having the lower surface coefficient of friction before causing the axle to assume the cross-axle lock condition. If satisfactory progress over ground is not made when the brake is applied, the system may be operable to command the axle to assume the cross-axle lock condition provided conditions (a) and (b) are still met.

The system may be operable to apply the brake to the wheel experiencing the lower surface coefficient of friction instead of causing the axle to assume the cross-axle locking condition in dependence on steering angle.

In some embodiments, if steering angle exceeds a prescribed value, the system may be operable not to cause the cross-axle lock condition to be assumed, but rather to apply a brake to the wheel experiencing the lower surface coefficient of friction.

The system may be operable to cause the vehicle to maintain the target speed value during application of brake and/or an increase in resistance to relative rotation of wheels of an axle by means of the cross-axle locking means.

The system may be operable to vary an amount of resistance to a difference in wheel speed between respective axles. The system may vary the amount of resistance by controlling an amount of resistance imposed by a centre differential of a vehicle.

In one aspect of the invention for which protection is sought there is provided a vehicle comprising a system according to a preceding aspect.

In a further aspect of the invention for which protection is sought there is provided a method of controlling a vehicle comprising:

causing a vehicle to operate in accordance with a target speed value; and causing an axle of the vehicle to assume a cross-axle lock condition in which relative rotation of wheels of the axle with respect to one another is substantially prevented, the method comprising causing the axle to assume the cross-axle lock condition when it is determined that (a) a cross-axle surface mu delta condition exists, being a condition in which a difference in coefficient of friction, mu, between respective wheels of an axle and a corresponding driving surface exceeds a prescribed value, and (b) a wheel The method may comprise causing the axle to assume the cross-axle lock condition in further dependence at least in part on a steering angle of the vehicle.

The method may comprise causing the axle to assume the cross-axle lock condition only if the steering angle is less than a prescribed value.

The method may comprise applying a brake to the wheel experiencing the lower surface coefficient of friction when conditions (a) and (b) are met instead of causing the axle to assume the cross-axle lock condition.

The method may comprise applying the brake to the wheel experiencing the lower surface coefficient of friction when conditions (a) and (b) are met, subsequently causing the axle to assume the cross-axle lock condition in dependence on a rate of progress of the vehicle over ground following application of the brake.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the invention will now be described, by way of example only, with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
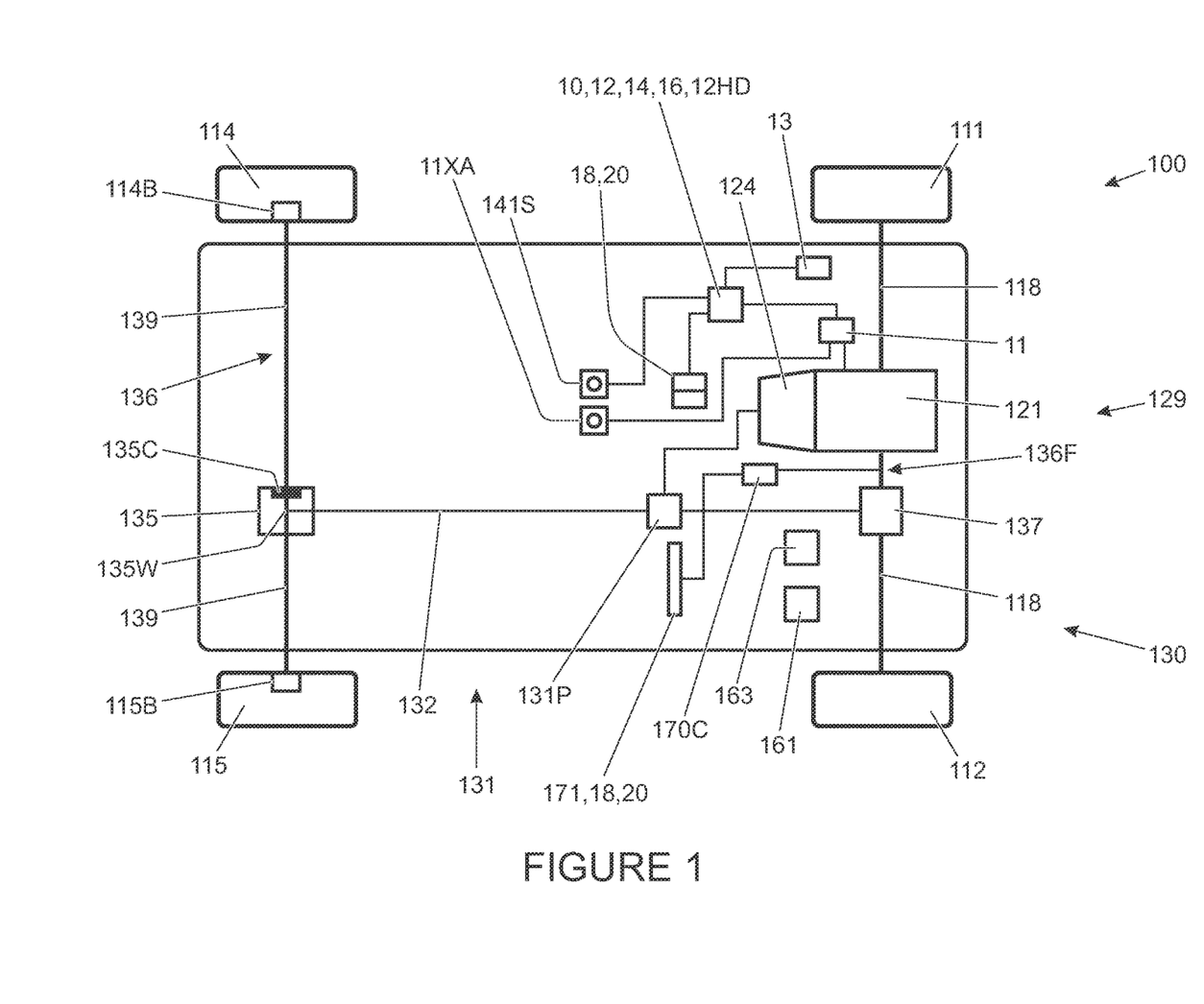
FIG. 1 is a schematic illustration of a vehicle according to an embodiment of the invention in plan view.
Figure 2:
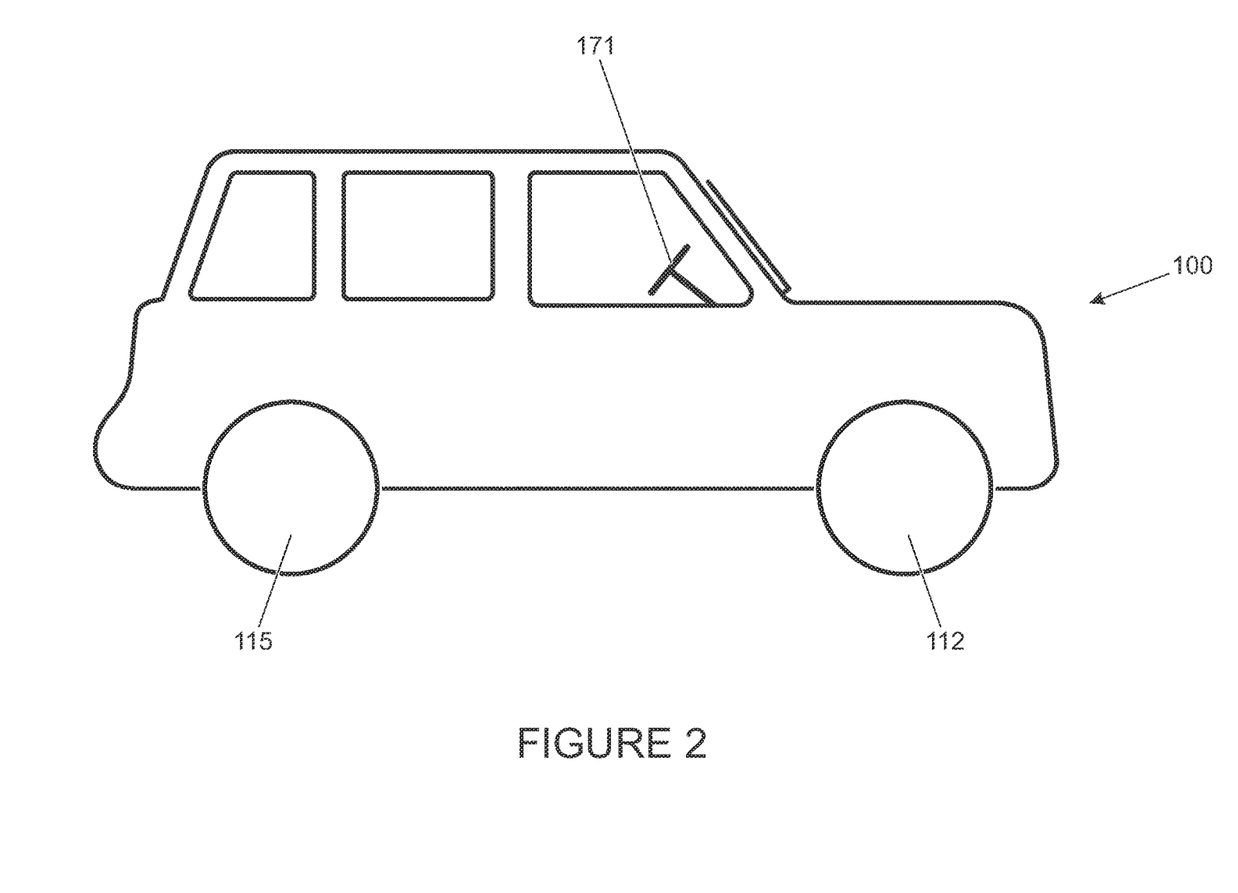
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
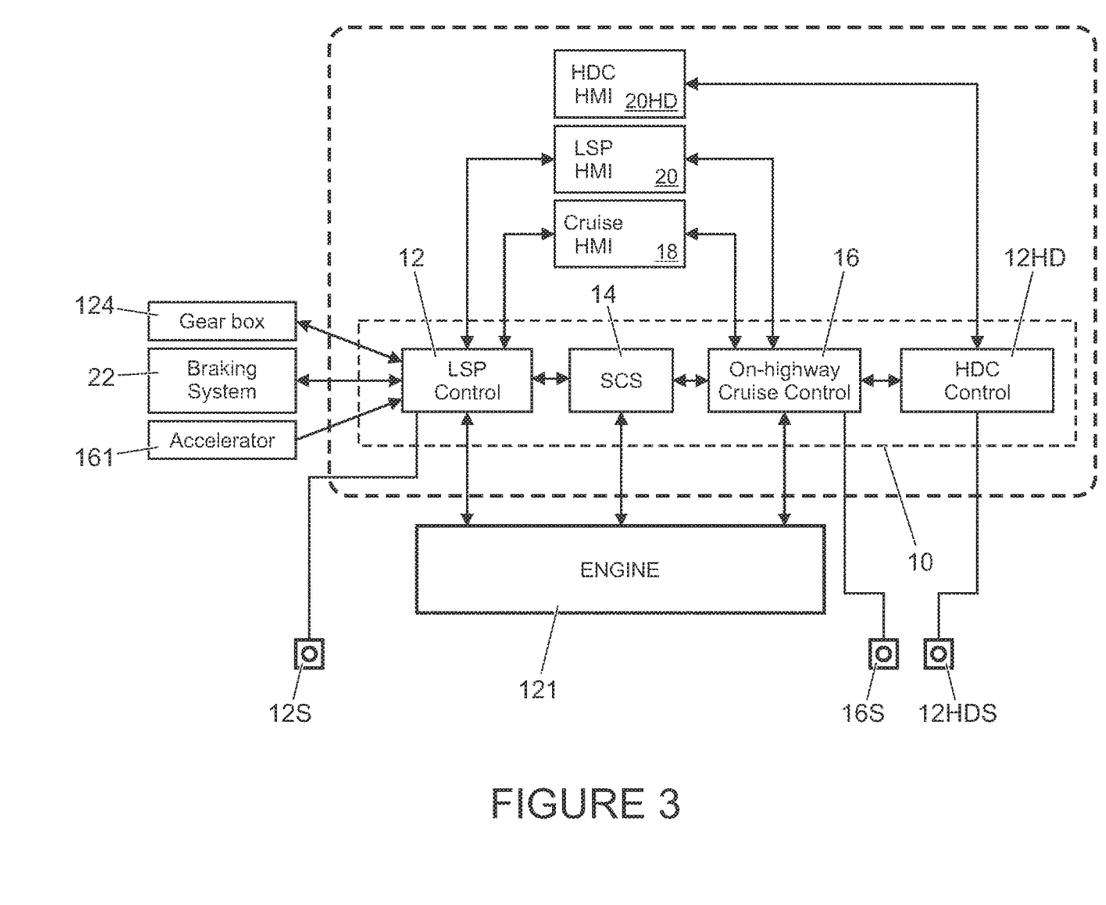
FIG. 3 is a high level schematic diagram of a vehicle speed control system of an embodiment of the present invention, including a cruise control system and a low-speed progress control system.

A control system for the vehicle engine 121 includes a central controller 10, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
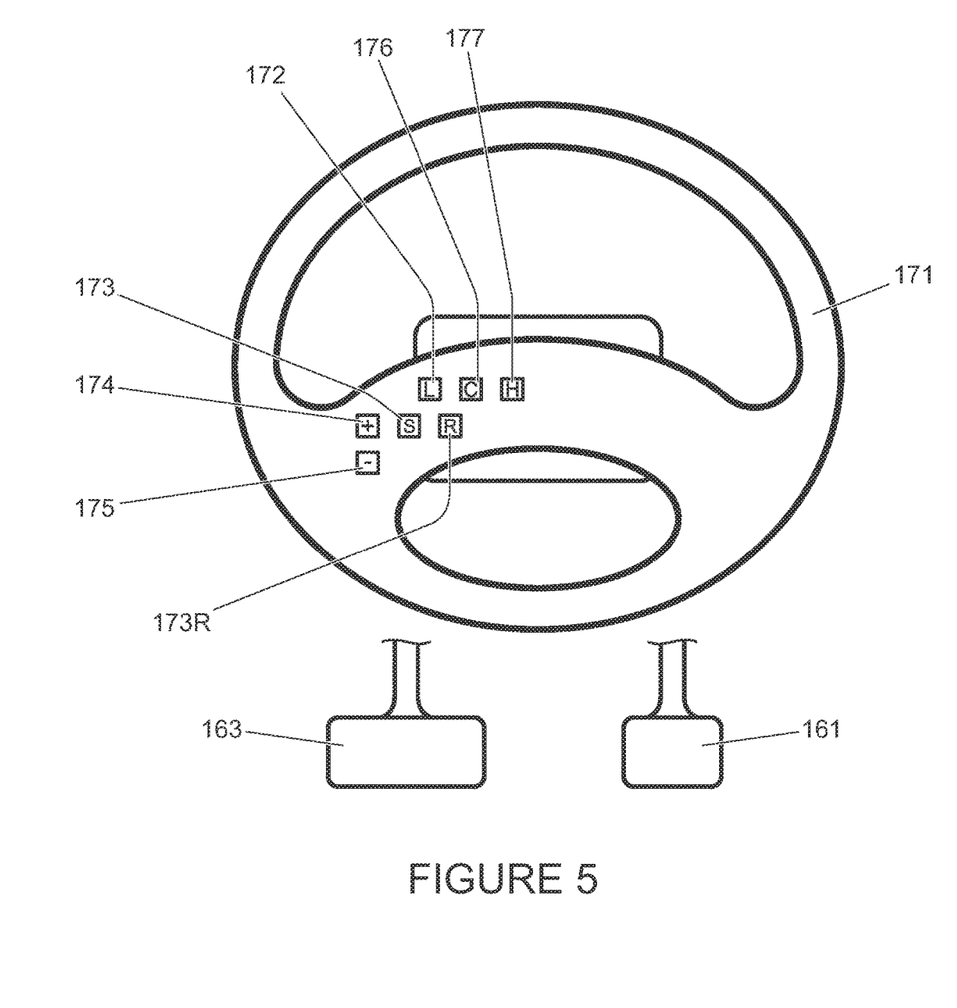
FIG. 5 illustrates a steering wheel and brake and accelerator pedals of a vehicle according to an embodiment of the present invention.

As noted above, the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses a brake pedal 163 or, in the case of vehicles with a manual transmission, a clutch pedal (not shown), the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and a hill descent control (HDC) control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of the HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored due to vehicle speed being above the limit for operation of the system 12HD.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls unless the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
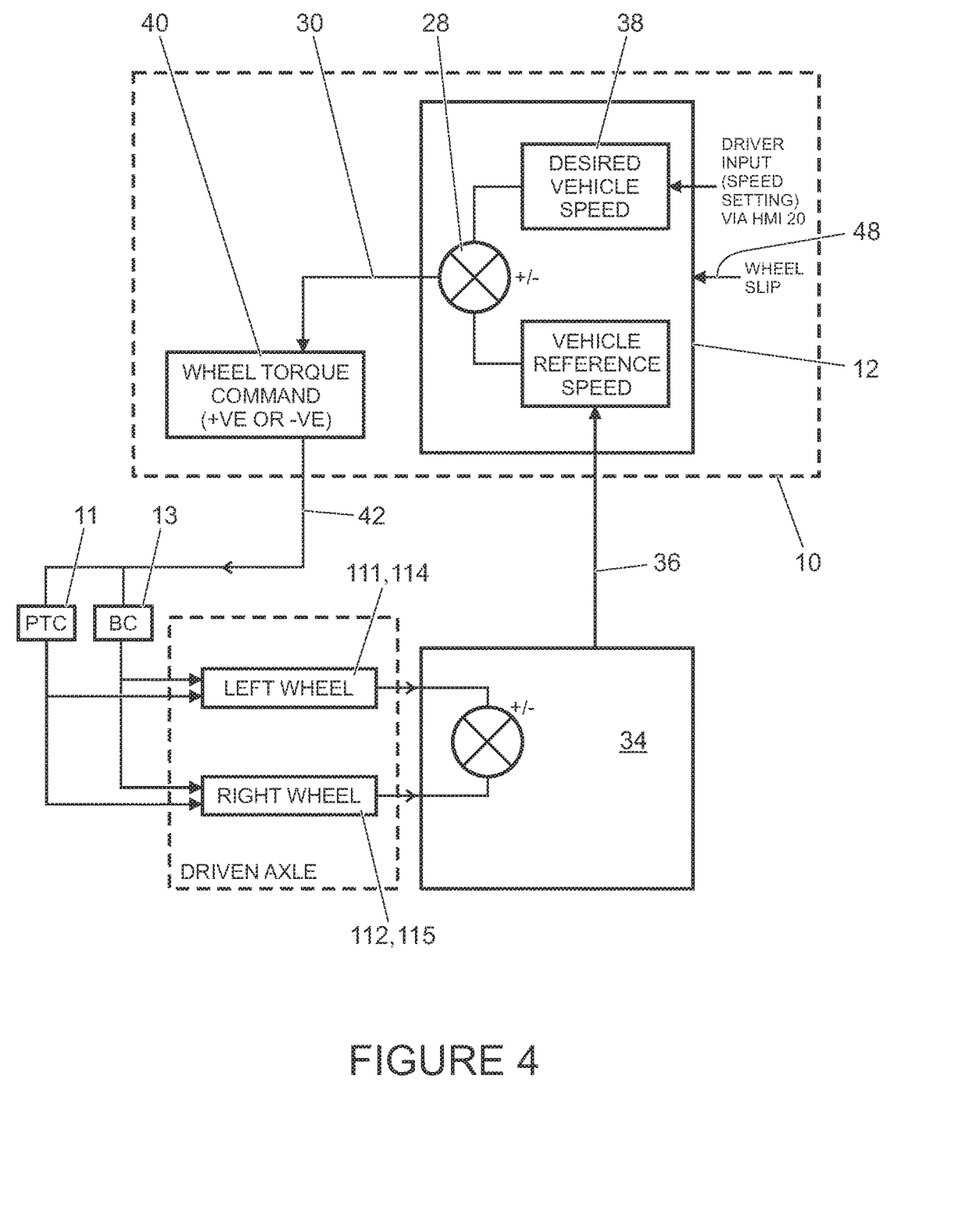
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16. In some arrangements the SCS 14 provides the wheel slip event signal 48 to the LSP control system 12 or cruise control system 16 depending on which system is operating at the time. In some arrangements the SCS 14 broadcasts the signal 48 on a controller area network (CAN) bus (not shown) with which the LSP control system 12 and cruise control system 16 are in communication, whereby the systems 12, 16 may detect the signal 48, A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation by the user in such conditions can be a difficult and often stressful experience and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

The nature of the terrain over which the vehicle is travelling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

When the vehicle 100 is operating with the LSP control system 12 active and the vehicle 100 is in the four wheel drive mode of operation, the powertrain controller 11 is operable automatically to command the rear differential 135 to increase a resistance to relative rotation of the left and right rear driveshafts 139 by assuming a cross-axle lock condition. In the cross-axle lock condition, relative rotation of left and right rear driveshafts 139 is substantially prevented. This feature is useful in assisting the vehicle 100 in making progress over terrain where the left and right hand rear wheels 114, 115 are experiencing different values of surface coefficient of friction with their respective driving surfaces.

The differential 135 is operable to assume the cross-axle lock condition by closure of a clutch 135C provided within a housing of the differential 135. When the clutch 135C is open, the differential 135 allows the left and right rear drive shafts 139 to rotate at different respective speeds in the conventional manner, for example whilst cornering. When the clutch 135C is fully closed, the differential 135 substantially prevents relative rotation of the left and right rear drive shafts 139. As described below, in some embodiments the amount of resistance to relative rotation of the wheels imposed by the differential 135 may be varied by varying the amount of pressure applied by an actuator of the clutch 135C to close the clutch 135C.

If the LSP control system 12 is not active, the powertrain controller 11 is operable to command the rear differential 135 to assume the cross-axle lock condition in response to user selection of that condition by means of a user-operable selector button 11XA. The selector button 11XA is accessible to a driver whilst driving the vehicle 100. The powertrain controller 11 causes the clutch 135C to assume either a fully open condition or a fully closed condition in dependence on a state of the selector button 11XA.

The powertrain controller 11 is configured to monitor a speed of rotation of each wheel of the vehicle 111, 112, 114, 115 and a speed of the vehicle 100 over ground. From this data the powertrain controller 11 is able to generate an estimate of slip of each wheel and an estimate of a surface coefficient of friction between each wheel and the respective driving surface. It is to be understood that, in general, only wheel slip values obtained from wheels that are being driven by the powertrain 129 are useful in determining surface coefficient of friction. This is because slip between non-driven wheels and the driving surface is generally negligible even for relatively low values of surface coefficient of friction. In some embodiments, surface coefficient of friction may be estimated from non-driven wheels when a brake is applied to the wheel to slow the vehicle. The speed of driven wheels and non-driven wheels may be compared in some embodiments.

The powertrain controller 11 is also configured to monitor a value of steering angle generated by the steering controller 170C.

The powertrain controller 11 is configured to detect when a cross-axle surface mu delta condition exists in respect of rear axle 136 (which includes the rear drive shafts 139 and rear differential 135). For the purposes of the present embodiment, the cross-axle surface mu delta condition is defined as a condition in which a difference in coefficient of friction, mu, between respective wheels 114, 115 of the rear axle 136 and the driving surface exceeds a prescribed value. In the present embodiment the prescribed value is substantially 0.1 although other values such as 0.05, 0.2, 0.25 or any other suitable value are also useful. The prescribed value may be set in dependence on selected driving mode in some embodiments.

In use, the powertrain controller 11 is configured automatically to command the rear differential 135 to assume the cross-axle lock condition if the controller 11 detects that (a) a cross-axle surface mu delta condition exists; (b) a steering angle is less than a prescribed value, and (c) the wheel 114, 115 experiencing the lower value of surface coefficient of friction is rotating at a speed that is greater than that of the wheel 115, 114 experiencing the higher value of surface coefficient of friction by more than a factor of 1.5. Other values of factor are also useful in some embodiments. Steering angle may be determined by reference to steerable road wheel angle, steering wheel position or any other suitable means.

In the present embodiment, the prescribed value of steering angle corresponds to a steerable road wheel angle of 5 degrees to the left or right of a straight-ahead steering position in response to driver manipulation of steering wheel 171.

If the powertrain controller 11 commands the rear differential 135 to assume the cross-axle lock condition in response to conditions (a) to (c), the controller 11 continues to monitor the value of surface coefficient of friction between the rear wheels 114, 115 and the driving surface, and the steering angle. If at any time the steering angle exceeds 5 degrees, the controller 11 is configured to provide an alert to a user indicating the steering angle is no longer within the allowable limit for automatic application of cross-axle lock. If the steering angle does not fall below 5 degrees within a prescribed period of time of the steering angle exceeding the allowable limit, the controller 11 automatically causes the cross-axle lock condition to terminate by commanding the clutch 135C to open. This feature has the advantage that brief excursions in steering wheel position beyond substantially 5 degrees relative to a straight-ahead position do not cause the cross-axle lock condition to be assumed, reducing the amount of unnecessary operation of the cross-axle lock feature of the differential 135.

Similarly, if the controller 11 determines that the vehicle 100 has travelled more than 25 metres since the cross-axle lock condition was assumed automatically, the controller 11 is operable automatically to cause the cross-axle lock condition to terminate.

If the controller 11 subsequently detects that conditions (a) to (c) above are met, the controller 11 is operable to command the rear differential 135 to again assume the cross-axle lock condition.

Embodiments of the present invention have the advantage that vehicle composure may be enhanced and driver workload may be reduced, since the powertrain controller 11 automatically causes the rear differential 135 to assume the cross-axle lock condition when driving conditions so warrant. Embodiments of the invention have the advantage that degradation of a driving surface may be reduced. This is because excessive slip of a wheel of an axle that is experiencing a lower value of surface coefficient of friction may be substantially prevented or at least reduced.

In some embodiments, the powertrain controller 11 is operable to command the brake controller 13 to apply a brake 114B, 115B to the wheel 114, 115 experiencing the lower value of surface coefficient of friction when conditions (a) to (c) are met without commanding the rear differential 135 to assume the cross-axle lock condition. The controller 11 may apply a substantially fixed amount of brake pressure or brake torque in some embodiments. In some alternative embodiments an amount of brake pressure or brake torque applied may be so as to reduce wheel speed such that the difference in speed of rotation of the rear wheels does not exceed that expected for zero slip by more than the prescribed amount. The amount of brake pressure or brake torque applied may be limited to a prescribed amount in some embodiments.

The controller 11 subsequently monitors vehicle progress over the driving surface by continuing to measure wheel slip and vehicle ground speed. If the controller 11 determines that wheel slip exceeds ground speed by more than a prescribed allowable value (which value may be determined in dependence on vehicle speed, terrain type, vehicle driving mode or any other suitable parameter), the controller 11 commands the rear differential 135 to assume the cross-axle lock condition. The controller 11 also commands a reduction in the brake pressure or brake torque that was applied to reduce the wheel speed difference, to the value applied before the increase due to wheel speed difference. Other arrangements are also useful.

In addition or instead, in some embodiments the powertrain controller 11 may be operable to command the brake controller 13 to apply a brake 114B, 115B in the manner described above if conditions (a) and (c) are met but not condition (b), i.e. the steering angle exceeds the prescribed value. The controller 11 may be configured not to cause the rear differential 135 to assume the cross-axle lock condition whilst the condition exists that the steering angle exceeds the prescribed value. This feature has the advantage that understeer due to operation of the rear axle 136 in the cross-axle lock condition may be prevented when the steering angle exceeds the prescribed value.

Other arrangements are also useful.

In some embodiments, the rear differential 135 may be operable to assume a condition intermediate the cross-axle lock condition. That is, the rear differential 135 may be operable to increase a resistance of the rear wheels 114, 115 to relative rotation without substantially preventing relative rotation. In some embodiments in which the rear differential 135 has a clutch 135C, this may be achieved by varying an amount of pressure applied to urge clutch plates or the like of a clutch pack of the clutch 135C together in order to close the clutch 135C. This pressure may be referred to as a cross-axle lock clutch closure pressure in some embodiments. In some embodiments the powertrain controller 11 may be operable to vary the cross-axle lock clutch closure pressure in dependence on one or more parameters.

The one or more parameters may include steering angle. Thus, the amount of closure pressure may reduce with increasing steering angle in some embodiments.

In some embodiments the powertrain controller 11 may be operable to set a prescribed baseline value of cross-axle lock clutch closure pressure in dependence on a selected driving mode or terrain response mode. The controller 11 may be configured to set the baseline value of clutch pressure when the driving mode is selected. The baseline value may be varied when in a given mode in dependence on vehicle speed and/or one or more other parameters. If the powertrain controller 11 subsequently detects that relative rotation of the wheels 114, 115 is occurring, the wheel speed difference being greater than that expected for the current steering angle by more than a prescribed amount, the controller 11 may be configured to increase the cross-axle lock clutch closure pressure in order to reduce the amount of relative rotation.

In some embodiments if the controller 11 intervenes to increase the cross-axle lock clutch closure pressure in order to reduce the amount of relative rotation of the wheels 114, 115, the controller 11 may set the amount of the increase to a value that permits a prescribed amount of relative rotation of the wheels 114, 115. This allows the controller 11 to determine when the increase in cross-axle lock clutch closure pressure is no longer required, allowing the amount of cross-axle lock clutch closure pressure to be reduced, thereby reducing understeer associated with increasing the cross-axle lock clutch closure pressure. The controller 11 may be configured to vary the amount of cross-axle lock clutch closure pressure subject to the condition that the amount does not fall below the baseline value for the current driving mode.

It is to be understood that in some embodiments the front differential 137 may be provided with cross-axle lock functionality in addition to or instead of the rear differential 135, optionally by means of a clutch (not shown). The powertrain controller 11 may be operable to control the front differential 137 to increase a resistance to relative rotation of the front wheels 111, 112 in a corresponding manner to that described above in respect of rear differential 135.

In some embodiments the powertrain controller 11 may be operable to monitor a difference in speed of rotation of the front wheels 111, 112, and to control the front differential 137 to increase the resistance imposed by the differential 137 to relative rotation of the wheels 111, 112 of front axle 136F in the event the difference in speed of the wheels 111, 112 exceeds that corresponding to the current steering angle (i.e. assuming substantially zero slip of each wheel) by more than a prescribed amount.

In some embodiments the controller 11 may be configured not to increase the resistance imposed by the differential 137 to relative rotation of the wheels 111, 112 of the front axle 136F in the event the speed difference of the wheels 111, 112 exceeds that corresponding to the current steering angle, if the current steering angle exceeds a prescribed amount. Thus, any change in understeer experienced by the vehicle 100 as a consequence of increasing the resistance to relative rotation of the wheels 111, 112 of the front axle 136F may be prevented. In some such embodiments the controller 11 may still command an increase in resistance to relative rotation of the rear wheels 114, 115 in dependence on the difference in speed of rotation. This feature has the advantage that traction may be improved, whilst avoiding a change in understeer due to the front axle 136F.

Figure 6:
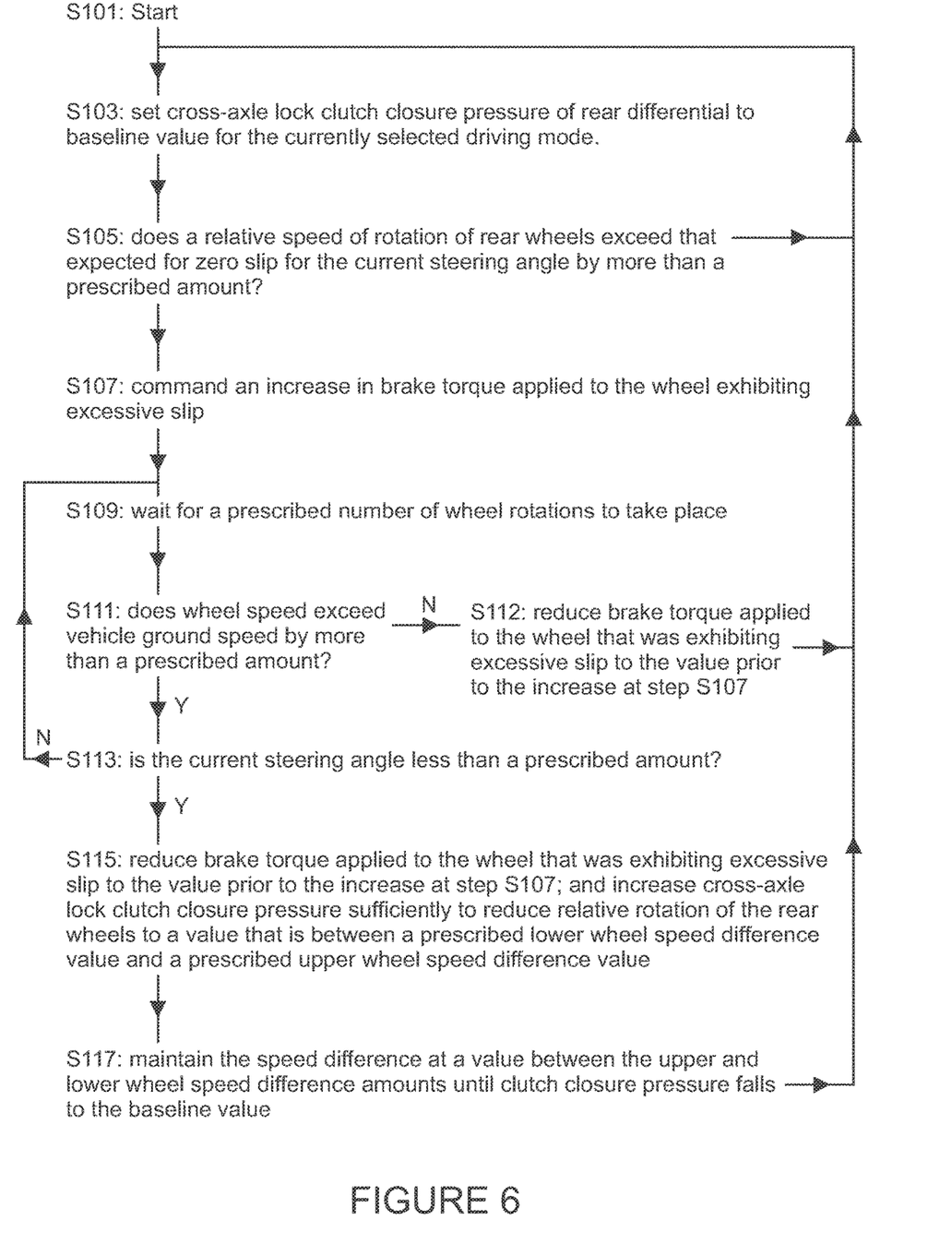
FIG. 6 is a flowchart illustrating operation of a vehicle according to an embodiment of the present invention.

FIG. 6 is a flowchart illustrating a method of operation of a vehicle 100 according to an embodiment of the present invention.

At step S101 the powertrain controller 11 commences execution of a portion of software code.

At step S103 the controller 11 sets a value of cross-axle lock clutch closure pressure of the clutch 135C of rear differential 135 to a predetermined baseline value for the currently selected driving mode. The pressure value may therefore be different depending on the driving mode, such as whether the driving mode is the rock crawl mode, sand mode, grass/gravel/snow mode, SPO mode or other driving mode.

At step S105 the controller 11 determines whether a relative speed of rotation of rear wheels 114, 115 exceeds that expected for zero slip of the wheels 114, 115 by more than a predetermined amount for the current value of steering angle, and the currently selected driving mode. If the relative speed of rotation does exceed the predetermined amount, the controller 11 continues to step S107. If it does not, the controller continues at step S103. The predetermined amount may be determined by means of an algorithm, a look up table (LUT) or any other suitable means. The predetermined amount may be set to a value sufficient to accommodate differences in wheel speed due to local variations in terrain height that will almost inevitably be encountered.

At step S107 the controller 11 commands an increase in brake torque applied to the brake 114B, 115B of the wheel 114, 115 exhibiting excessive slip, in order to manage that slip. The controller 11 then continues at step S109.

At step S109 the controller 11 waits for a prescribed number of wheel rotations to take place and continues to monitor wheel speed. The controller 11 then continues at step S111.

At step S111 the controller 11 determines whether the speed of rotation of one or both of the rear wheels 114, 155 exceeds ground speed by more than a prescribed amount. The determination takes into account steering angle and the currently selected driving mode.

If at step S111 the controller determines that the speed of rotation of one or both of the rear wheels 114, 155 does not exceed ground speed by more than the prescribed amount, the controller 11 continues at step S112.

At step S112 the controller 11 reduces the amount of brake torque applied to the wheel 114, 115 that was exhibiting excessive slip at step S107 to the value applied immediately prior to the increase at step S107. The controller 11 then continues at step S103.

If the controller 11 determines that the speed of rotation of one or both of the rear wheels 114, 155 does exceed ground speed by more than the prescribed amount, the controller 11 continues at step S113.

At step S113 the controller 11 determines whether the current steering angle is less than a prescribed amount. If the controller 11 determines that the current steering angle is not less than the prescribed amount, the controller 11 continues at step S109. If the controller 11 determines that the current steering angle is less than the prescribed amount the controller 11 continues at step S115.

At step S115 the controller 11 commands a reduction in the amount of brake torque applied to the brake 114B, 115B of the wheel 114, 115 to the value applied prior to the increase at step S107. Substantially simultaneously, the controller 11 also commands an increase in cross-axle lock clutch closure pressure by an amount that is sufficient to reduce relative rotation of the rear wheels 114, 115 to a value that is between a prescribed lower wheel speed difference value and a prescribed upper wheel speed difference value. The values may be proportional to wheel speed, absolute values, or any other suitable values. The controller 11 then continues at step S117.

At step S117 the controller 11 maintains the speed difference between the wheels 114, 115 at a value between upper and lower wheels speed difference values until cross-axle lock clutch closure pressure falls to the baseline value.

The controller 11 then continues at step S103.

It is to be understood that one or more of the steps listed above may be performed in a different order to that described, or modified according to the requirements of a particular embodiment.

Embodiments of the present invention have the advantage that cross-axle lock functionality of a vehicle 100 may be controlled automatically by a controller 11, increasing vehicle composure and reducing driver workload. Degradation of a driving surface due to slip of one or more wheels may be reduced or substantially prevented in some embodiments.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle speed control system operable to cause a vehicle to operate in accordance with an automatic target speed value, the system being further operable to cause an axle of the vehicle to assume a cross-axle lock condition in which relative rotation of wheels of the axle with respect to one another is substantially prevented,
    wherein the system is operable to cause the axle to assume the cross-axle lock condition when it is determined that:
    (a) a cross-axle surface mu delta condition exists, being a condition in which a difference in coefficient of friction, mu, between respective wheels of an axle and a corresponding driving surface exceeds a prescribed value, and
    (b) a wheel experiencing the lower surface coefficient of friction is rotating faster than the wheel experiencing the higher surface coefficient of friction by more than a prescribed amount.

2. A vehicle speed control system according to claim 1 wherein the prescribed amount is a substantially fixed value.

3. A vehicle speed control system according to claim 1 wherein the prescribed amount is a value determined in dependence on one or more parameters.

4. A vehicle speed control system according to claim 3 wherein the value is determined from a look-up table or by using an algorithm.

5. A vehicle speed control system according to claim 1 operable to cause the axle to assume the cross-axle lock condition in further dependence at least in part on a steering angle of the vehicle.

6. A vehicle speed control system according to claim 5 operable to cause the axle to assume the cross-axle lock condition only if the steering angle is less than a prescribed value.

7. A vehicle speed control system according to claim 1 operable to cause the axle to assume the cross-axle lock condition independently of a steering angle of the vehicle.

8. A vehicle speed control system according to claim 7 operable to cause the cross-axle lock condition to be assumed provided conditions (a) and (b) are met and the difference in wheel speeds exceeds that which would be expected for a cornering condition of the vehicle, regardless of the instant steering angle.

9. A vehicle speed control system according to claim 1 operable to apply a brake to the wheel experiencing the lower surface coefficient of friction when conditions (a) and (b) are met.

10. A vehicle speed control system according to claim 9 operable to apply the brake to the wheel experiencing the lower surface coefficient of friction when conditions (a) and (b) are met, the system being operable subsequently to cause the axle to assume the cross-axle lock condition in dependence on a rate of progress of the vehicle over ground following application of the brake.

11. A vehicle speed control system according to claim 10 operable to determine whether to cause the axle to assume the cross-axle lock condition in dependence on speed of the vehicle over ground or rate of acceleration of the vehicle over ground.

12. A vehicle speed control system according to claim 1 operable to cause the vehicle to maintain the automatic target speed value during application of brake and/or an increase in resistance to relative rotation of wheels of an axle by means of the cross-axle locking means.

13. A vehicle comprising a vehicle speed control system according to claim 1.

14. A method of controlling a vehicle comprising:
    causing a vehicle to operate in accordance with an automatic target speed value; and
    causing an axle of the vehicle to assume a cross-axle lock condition in which relative rotation of wheels of the axle with respect to one another is substantially prevented, the method comprising causing the axle to assume the cross-axle lock condition when it is determined that;

(a) a cross-axle surface mu delta condition exists, being a condition in which a difference in coefficient of friction, mu, between respective wheels of an axle and a corresponding driving surface exceeds a prescribed value, and
(b) a wheel experiencing the lower surface coefficient of friction is rotating faster than the wheel experiencing the higher surface coefficient of friction by more than a prescribed amount.

15. A method according to claim 14 comprising causing the axle to assume the cross-axle lock condition in further dependence at least in part on a steering angle of the vehicle.

16. A method according to claim 15 wherein the method comprises causing the axle to assume the cross-axle lock condition only if the steering angle is less than a prescribed value.

17. A method according to claim 14 comprising applying a brake to the wheel experiencing the lower surface coefficient of friction when conditions (a) and (b) are met, subsequently causing the axle to assume the cross-axle lock condition in dependence on a rate of progress of the vehicle over ground following application of the brake.

18. A method according to claim 14 comprising causing the vehicle to maintain the automatic target speed value during application of brake and/or an increase in resistance to relative rotation of wheels of an axle by means of the cross-axle locking means.

* * * * *